United States Patent [19]
Jansen

[11] Patent Number: 5,803,802
[45] Date of Patent: Sep. 8, 1998

[54] APPARATUS FOR OPENING THE BODY CAVITY OF A SLAUGHTERED BIRD

[75] Inventor: Tom Cornelis Jansen, Oostzaan, Netherlands

[73] Assignee: Machinefabriek Meyn B.V., Oostzaan, Netherlands

[21] Appl. No.: 701,441

[22] Filed: Aug. 22, 1996

[30] Foreign Application Priority Data

Aug. 25, 1995 [NL] Netherlands .......................... 1001058

[51] Int. Cl.$^6$ .................................................. A22B 5/20
[52] U.S. Cl. .......................................... 452/160; 452/120
[58] Field of Search .................. 452/160, 120, 452/165

[56] References Cited

U.S. PATENT DOCUMENTS

| | | | |
|---|---|---|---|
| 1,687,663 | 10/1928 | Goldfinger | 452/160 |
| 2,310,881 | 2/1943 | Swanson | 452/160 |
| 2,795,815 | 6/1957 | Dahlberg . | |
| 3,806,988 | 4/1974 | Harben, Jr. | 452/118 |
| 4,136,421 | 1/1979 | Scheier et al. . | |
| 4,467,500 | 8/1984 | Olson . | |
| 4,564,977 | 1/1986 | Scheier | 452/109 |
| 4,662,028 | 5/1987 | Leining | 452/160 |
| 4,841,602 | 6/1989 | van der Hoorn et al. | 452/160 |
| 5,139,457 | 8/1992 | Bankin et al. | 452/160 |

FOREIGN PATENT DOCUMENTS

| | | |
|---|---|---|
| 0245543 | 11/1987 | European Pat. Off. . |
| 2593676 | 4/1987 | France . |
| 7315347 | 5/1975 | Netherlands . |
| 7513767 | 2/1977 | Netherlands . |
| 7510362 | 3/1977 | Netherlands . |
| 7801712 | 8/1979 | Netherlands . |
| 8101527 | 10/1982 | Netherlands . |

OTHER PUBLICATIONS

Netherlands Search Report, Aug. 25, 1995.

Primary Examiner—Willis Little
Attorney, Agent, or Firm—Dority & Manning

[57] ABSTRACT

The invention relates to an apparatus for opening the body cavity of a slaughtered bird starting from the cloaca. Through the cloaca, a tensioning means is moved into the body cavity and towards the tip of the chest, which tensioning means tensions the skin of the bird. Next, a cutting device cooperating with the tensioning means in a scissors-like manner cuts the skin. The tensioning means may comprise two plate sections positioned alongside each other. The apparatus may be part of a rotating processing apparatus at the circumference of which a number of such apparatus are provided.

9 Claims, 1 Drawing Sheet

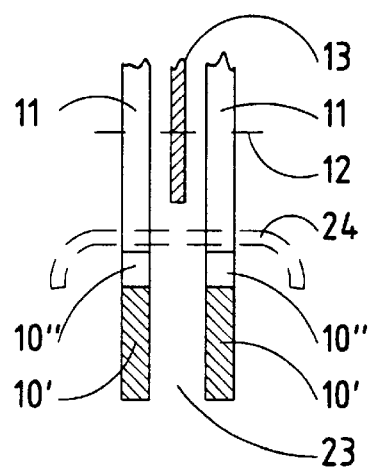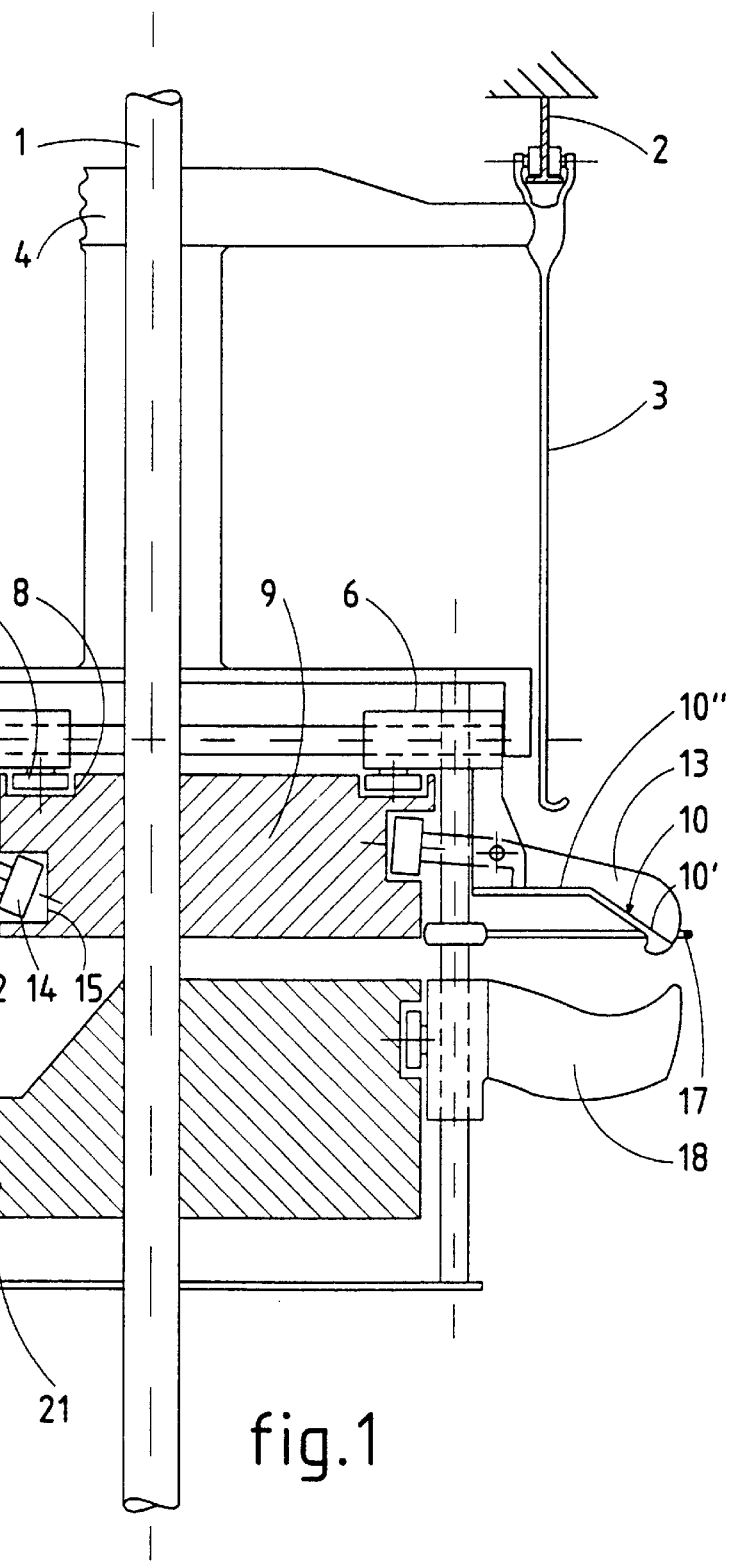

APPARATUS FOR OPENING THE BODY CAVITY OF A SLAUGHTERED BIRD

BACKGROUND OF THE INVENTION

The invention relates to an apparatus for opening the body cavity of a slaughtered bird starting from the cloaca.

Using a known apparatus of said type, a two-piece sphere is pushed into the cloaca of the bird, whereafter one half of the sphere is inwardly moved towards the tip of the chest of the bird. At the side of the half sphere facing the skin of the bird, a knife is provided which cuts through the skin during the motion of the half sphere.

This known apparatus suffers from several disadvantages. Firstly, it cannot be prevented that, in certain cases, the knife also cuts through intestines, such as to expose its contents which contaminates the bird. Secondly, the knife will become blunt rapidly, such that for a proper operation of the apparatus the knife should be replaced frequently. Thirdly, said known apparatus cannot properly take into account birds having different dimensions. If a very small bird has to be opened, it can happen that the knife cuts through the tip of the chest of the bird, which is undesirable. However, in case of a bird being larger than average, the cut is not made large enough such that the bird is not fully opened.

OBJECTS AND SUMMARY OF THE INVENTION

It is an object of the invention to provide an apparatus for opening the body cavity of a slaughtered bird starting from the cloaca, in which the disadvantages noted above have been removed in a simple, but nevertheless effective way. Additional objects and advantages of the invention will be set forth in part in the following description, or may be obvious from the description, or may be learned through practice of the invention.

Thus, the apparatus according to the invention is characterized by a tensioning means which is inserted into the body cavity through the cloaca and towards the tip of the chest for engaging the skin of the bird from the inside, and by a cutting device cooperating with said tensioning means in a scissors-like manner. The tensioning means is applied into the body cavity of the bird through the cloaca and towards the tip of the chest and, like this, tensions the skin between the cloaca and the tip of the chest. Next, the cutting device is activated as a result of which the skin of the bird between the cloaca and the tip of the chest is cut open. By means of the tensioning means, a reproducible positioning of the bird relative to the cutting device occurs, as a result of which the created opening extends always along the entire desired distance (from the cloaca until the tip of the chest). Moreover, one can prevent that an undesired damaging of the intestines occurs because the tensioning means is pushed into the body cavity of the bird immediately below the skin, and thus between the intestines and the skin. The motion of the cutting device is determined by the location of the tensioning means, such that the cutting device too will not engage the intestines. Finally, due to the scissors-like operation, a lower wear of the parts of the apparatus is obtained, especially of the cutting device, such that replacement thereof has to occur considerably less frequently compared to the knife of the known apparatus.

According to a preferred embodiment of the apparatus according to the invention, the tensioning means comprises two corresponding plate sections positioned alongside each other leaving free therebetween a slot for receiving the cutting device. Both plate sections tension the skin of the slaughtered bird between the cloaca and the tip of the chest from the inner side. While opening the body cavity, the cutting device will move downward between both plate sections while both plate sections keep supporting the skin at both sides of the cutting device. Like this, cutting open of the body cavity can be carried out optimally without, for example, a shift of the skin occurring.

Constructively, an embodiment of the apparatus is preferred in which the tensioning means is shaped as a rod with a first rearmost part which extends substantially in parallel with its direction of application, and with a foremost part connecting thereto and enclosing therewith such an angle that the convex side of the rod will engage the skin of the bird. By means of the foremost part which defines an angle, the tensioning means is pushed into the cloaca of the bird to be processed. When next the tensioning means is moved towards the tip of the chest at the innerside of the skin, the foremost part takes care of gradually tensioning the skin. In this aspect, the convex shape of a road is adapted to the anatomy of the bird.

In this aspect, it further is preferred that the tip of the foremost part of the tensioning means is bluntly shaped. Such a blunt tip offers two advantages. On one hand it prevents that the tip of the tensioning means breaks through the intestines, whereas on the other hand damaging the tip of a chest, especially of small birds, is avoided. In case of a small bird, the blunt tip will stretch the tip of the chest, such that on activation of the cutting device the tip of the chest will stay out of reach from it.

Further, a special embodiment of the apparatus is mentioned, according to which the tensioning means and the cutting device are mounted onto the circumference of a rotating processing apparatus, wherein the tensioning means and the cutting device are radially movable relative to the processing apparatus, whereas further the cutting device is pivotable relative to the processing apparatus. Such a rotating processing apparatus is used on a large scale for processing slaughtered birds. Often, such a processing apparatus cooperates with a suspension conveyor on which birds are conveyed suspended by their legs. Then the track of the suspension conveyor coincides with part of the circumference of the processing apparatus at which position the processing apparatus can process passing birds. Generally such a processing apparatus carries a number of tensioning means and cutting devices cooperating therewith regularly spaced around its circumference.

If such a rotating processing apparatus is applied, it may comprise cooperating follower rolls and curved tracks provided on the tensioning means and the cutting device as well as the processing apparatus, respectively, for realizing the radial motion and pivoting of the tensioning means and cutting device, respectively. Per se curved tracks and follower rolls cooperating therewith for realizing a wide range of movements are know.

Finally, there is mentioned the possibility that positioning means are applied for positioning a bird to be processed relative to the tensioning means. As a result of said positioning means, a bird has a stationary position relative to the tensioning means and to the cutting device while opening the body cavity. Particularly this is essentially at the moment where the tensioning means is pushed into the cloaca, because at such a moment the cloaca should have an exactly defined position.

Hereinafter the invention is elucidated referred to the drawing in which an embodiment of the apparatus according to the invention is illustrated.

BRIEF DESCRIPTION OF THE DRAWINGS

FIG. 1 shows schematically and in section part of an embodiment of the apparatus according to the invention, and FIG. 2 shows on a larger scale a section according to 11—11 in FIG. 1.

DETAILED DESCRIPTION OF THE PREFERRED EMBODIMENTS

Reference will now be made in detail to the presently preferred embodiments of the invention, one or more examples of which are illustrated in the drawings. Each example is provided by way of explanation of the invention, and not as a limitation of the invention. For example, features illustrated or described as part of one embodiment can be used on another embodiment to yield still a further embodiment.

FIG. 1 shows schematically part of a longitudinal section of an apparatus for opening the body cavity of a slaughtered bird. The illustrated apparatus defines a processing apparatus rotating around a central axis 1. In a way known per se, the processing apparatus cooperates with a suspension conveyor 2 which is provided with suspension hooks 3 engaging the legs of a slaughtered bird. The motion of the suspension conveyor 2 and the rotation of the processing apparatus are synchronized through an uppermost section 4 of the processing apparatus. This belongs to the general knowledge of an expert in this field, such that a further explication is not necessary.

The processing apparatus comprises radially extending guides 5 regularly spaced around its circumference along which slides 6 are movable to and fro. Each slide 6 carries a follower roll 7 cooperating with a curved track 8 defined in a stationary core 9 of the processing apparatus.

The slide 6 carries a tensioning means 10 which, as appears from FIG. 2, comprises two rods positioned alongside each other having a foremost part 10' and a rearmost part 10". The rods 10 each are connected with the slide 6 by means of a connecting plate 11.

An embodiment comprising only one rod 10 is conceivable too.

By means of a hinge axis 12, a plate-like cutting device 13 is positioned between both connecting plates 11. Onto the rearward side of said cutting device 13, a follower roll 14 is mounted cooperating with a curved track 15 at the stationary core 9.

The processing apparatus further comprises vertical guidings 16, a U-shaped brace 17 provided stationary thereto and known per se, and a positioning plate 18 movable upward and downward along the guiding 16, which for its upward and downward motion is provided with a follower roll 19 cooperating with a curved track shaped in a stationary core 21.

The apparatus operates as follows: A slaughtered bird (not illustrated) which is supplied suspending with its legs from a suspension hook 3 of the suspension conveyor 2, is positioned with its legs at both sides of the U-shaped brace 17 while its back faces the central axis 1 of the apparatus. During the rotational motion of the apparatus, the follower roll 19 of the positioning plate 18 follows the curved track 20, such that the plate 18 is moved upward and engages the lower side of the legs of the bird and, as a result, pushes the bird with its lower body firmly against the U-shaped brace 17. In this manner, an exactly defined position of the bird occurs.

Further, as a result of the rotation of the apparatus around the central axis 1 and through a cooperation between the follower roll 7 of the slide 6 and the curved track 8 defined in the stationary core 9, the slide 6 will move to the left (as seen in FIG. 1) such that the rods 10 with their end (which is provided with a blunt tip 22) are pushed into the cloaca of the bird. Along the inclined foremost part 10', the skin of the bird is tensioned between the cloaca and the tip of the chest. The tensioned position of the skin is indicated schematically in FIG. 2 by a dotted line 24. Generally, the slide 6 will be displaced that far until it has been guaranteed that, irrespective of the dimension of the bird to be processed, the blunt tips 22 of the rods 10 engage the tip of the chest of the bird.

Probably it is superfluous to mention that the radial change of position of the curved track 8 relative to the central axis 1 is always the same as the radial change of position of the curved track 15 which is followed by the follower roll 14 which takes care of a pivotal movement of the cutting device 13 around hinge axis 12.

When, in correspondence with the above, the rods 10 acting as tensioning means have tensioned the skin of the bird, the follower roll 14 reaches a rising section of the curved track 15 such as to pivot the cutting device 13 around hinge axis 12. As a result, the cutting device 13 moves towards the slot 23 extending between both rods 10 (see FIG. 2). Due to the corporation between the cutting device 13 and both rods 10, the skin is cut open from the cloaca until the tip of the chest of the bird. The end position reached by the rods 10 and a cutting device 13 after cutting open the body cavity of the bird, is represented at the right in FIG. 1. One can see that the radial position of the rods 10 and the cutting device 13 relative to the central axis 1 has been changed, such that these are further distanced from the axis. Moreover, the cutting device 13 is pivoted downward between both rods 10. Further, this side of FIG. 1 shows that the positioning plate 18 is moved upward.

After the body cavity of the bird is cut open like this, all parts move back towards their starting position, whereafter the corresponding suspension hook 3 leaves the section of its track corresponding with a section of the circumference of the processing apparatus and removes the bird from the processing apparatus.

The invention is not limited to the embodiment described before which can be varied widely within the scope of the invention as defined by the claims.

I claim:

1. An automated apparatus for providing access to a body cavity of slaughtered poultry by cutting skin adjacent a cloaca of said poultry, said apparatus comprising a tensioning device movable into the body cavity of said poultry through said cloaca to a position so as to engage and tension said skin adjacent said cloaca from inside said cavity, and a cutting device movable relative to said tensioning device to subsequently cut said tensioned skin from generally said cloaca to generally a tip of a chest of said poultry, said tensioning device comprising spaced apart members automatically movable into said cavity to tension the skin from inside the cavity, said spaced apart members defining a space therebetween for receipt of said cutting device to cut the tensioned skin.

2. The apparatus as in claim 1, wherein said spaced apart members comprise a first generally horizontal section extending generally parallel to a direction of movement of said members, and a foremost section connected to said horizontal section and forming an angle therewith, said foremost section engaging said skin.

3. The apparatus as in claim 2, wherein said foremost section further comprises a blunt end.

4. The apparatus as in claim 1, wherein said tensioning device and said cutting device are operably mounted on a circumference of a rotating processing apparatus, said tensioning device and said cutting device movable radially relative to said circumference, said cutting device pivotally mounted relative to said processing apparatus and movable towards said tensioning device.

5. The apparatus as in claim 4, wherein said rotating processing apparatus further comprises follower rollers and curved tracks to provide said radial and pivotal movement of said tensioning device and said cutting device.

6. The apparatus as in claim 1, further comprising an automated positioning device disposed and movable relative to said tensioning device to engage and move said poultry to a position for said tensioning device to enter said cavity.

7. An automated process for cutting skin adjacent cloaca of slaughtered poultry to provide access to an internal cavity of the poultry in subsequent processing thereof, said process comprising engaging and positioning the poultry so as to provide access to the cloaca; moving a tensioning device into the cavity of the poultry through the cloaca; engaging and tensioning skin of the poultry adjacent the cloaca from inside the cavity with tensioning members of the tensioning device inserted into the cavity through the cloaca generally up to the tip of the chest of the poultry; and cutting the tensioned skin by moving a cutting device which is separate from the tensioning members towards the tensioning device so as to cut the skin from generally the cloaca to generally the tip of the chest of the poultry.

8. The process as in claim 7, further comprising moving the slaughtered poultry on a suspension conveyor through a processing station wherein said remaining steps are performed.

9. The process as in claim 8, wherein the processing station comprises a rotating device, and further comprising moving the poultry around at least a portion of a circumference of the rotating device for performing said remaining steps.

* * * * *

UNITED STATES PATENT AND TRADEMARK OFFICE
CERTIFICATE OF CORRECTION

PATENT NO. : 5,803,802
DATED : SEPTEMBER 8, 1998
INVENTOR(S) : TOM CORNELIS JANSEN

It is certified that error appears in the above-identified patent and that said Letters Patent is hereby corrected as shown below:

Column 1, between lines 35 and 36

--As used throughout this description, the term "cloaca" refers to the vent opening defined in the poultry by the conventional process of cutting out the vent and hanging the vent over the back of the carcass.--.

Column 2, line 19, delete "road" and substitute therefor --rod--.

Column 2, line 54, delete "know" and substitute therefor --known--.

Signed and Sealed this

Fifteenth Day of February, 2000

*Attest:*

Q. TODD DICKINSON

*Attesting Officer*       *Commissioner of Patents and Trademarks*